US00RE38031E

(19) United States
(12) Reissued Patent
Bjorklund

(10) Patent Number: US RE38,031 E
(45) Date of Reissued Patent: Mar. 18, 2003

(54) COAT CONSTRUCTION

(75) Inventor: B. Lennart Bjorklund, Vernon Hills, IL (US)

(73) Assignee: Hart Schaffner & Marx, Chicago, IL (US)

(21) Appl. No.: 09/186,260

(22) Filed: Nov. 4, 1998

Related U.S. Patent Documents

Reissue of:
(64) Patent No.: 5,669,072
Issued: Sep. 23, 1997
Appl. No.: 08/685,868
Filed: Jul. 23, 1996

(51) Int. Cl.[7] ..... A41D 3/02
(52) U.S. Cl. ..... 2/93; 2/97; 2/272
(58) Field of Search ..... 2/93, 85, 97, 272, 2/108, 243.1

(56) References Cited

U.S. PATENT DOCUMENTS

| | | | |
|---|---|---|---|
| 762,359 | A | 6/1904 | Steinberg |
| 956,238 | A | 4/1910 | Warren |
| 1,106,199 | A | 8/1914 | Fink |
| 2,121,836 | A | 6/1938 | Steinberger |
| 2,140,853 | A | 12/1938 | Sandone |
| 3,725,954 | A | 4/1973 | Baldini |
| 3,827,084 | A | 8/1974 | Seta |
| 4,011,599 | A | 3/1977 | Chaney et al. |
| 4,012,550 | A | 3/1977 | Hollander |
| 4,214,319 | A | 7/1980 | Bollag |
| 4,411,025 | A | 10/1983 | Magidson |
| 4,495,661 | A | 1/1985 | Kamat |
| 4,521,921 | A | 6/1985 | Bregatta |
| 4,796,305 | A | 1/1989 | Itoh |

OTHER PUBLICATIONS

Prestige III, Burberry Coat.

*Primary Examiner*—Gloria M. Hale
(74) *Attorney, Agent, or Firm*—Brinks Hofer Gilson & Lione

(57) ABSTRACT

The present invention is directed to a coat having a shell piece, a fusible interlining, a lapel support component, and a separate chest support component. The shell piece includes body and lapel portions. The body portion has a curved upper edge for attachment to a sleeve. The fusible interlining is attached to only the body portion of the shell piece. The lapel support component is attached to only the lapel portion of the shell piece. The separate chest support component is attached to the body portion of the body piece. The lapel support component and the chest support component are formed from first and second materials having different average weights.

48 Claims, 2 Drawing Sheets

COAT CONSTRUCTION

Matter enclosed in heavy brackets [ ] appears in the original patent but forms no part of this reissue specification; matter printed in italics indicates the additions made by reissue.

FIELD OF THE INVENTION

The present invention relates to an improved coat construction. More particularly, the present invention relates to an improved support structure for the lapel and chest areas of a suit coat, sport coat or the like.

BACKGROUND OF THE INVENTION

Coats are typically constructed using an exterior or shell layer that is attached to a number of internal supporting layers and an interior lining. When the structure and materials forming these layers are selected, the lapel and chest areas should be designed in order to provide firm support and also be durable over time. On the other hand, the lapel must also have a proper "roll," and not become flat or lifeless. In addition, these features must be achieved through the use of a construction that can be manufactured in an efficient and cost effective manner.

During the design of a suit coat, the selection of the particular materials used to form these layers is important to the coat's appearance and durability. However, the selection of these materials has proven troublesome. In particular, a material that improves durability can also detract from the appearance of the coat, and vice versa. In addition, the selection of particular materials and constructions can increase the difficulty of manufacturing the coat, as well as the cost of construction. Accordingly, various attempts have been made to design a durable coat that has a pleasing lapel appearance while also bring capable of bring manufactured in an efficient manner.

For example, a suit coat has previously been constructed using canvas layers to support the lapel and body portions. As disclosed in U.S. Pat. No. 762,359, issued to Steinberg on Jun. 14, 1904, three canvas pieces are attached to the front panel of the coat. The first piece is attached to the lapel, and the second and third canvas pieces are attached to the body of the front panel. While canvas provides good support for the chest and lapel areas, this construction has certain disadvantages. First, there is an increased likelihood of puckering, i.e., the wrinkling of the coat, because of the different reactions of canvas and the shell fabric to heat and moisture. These problems can be further aggravated by dry leaning the coat. Second, because canvas is a relatively heavy material, this construction can become heavier than generally preferred.

Another example of a previous suit coat construction is shown in U.S. Pat No. 2,121,836, issued to A. J. Steinberger on Jun. 28, 1938. As discussed in the '836 patent, the facing layer includes a one-piece canvas supporting layer attached to the lapel and body portions of the coat. A felt layer is attached over the canvas layer in the lapel area of the coat and a thermoplastic material is attached over the canvas layer in the chest area of the coat. While the use of canvas in the lapel and body areas of the suit coat is advantageous to the support of these areas, problems still exist with puckering and increased weight.

In a further example, a suit coat was previously constructed using a fusible interior layer attached to the body of the suit coat, but not to the lapel. A one-piece canvas component was attached across the lapel and chest areas with a felt layer bring attached over the canvas in the chest area. This construction implements the advantageous use of a fusible material in the body area of the coat while also using canvas to support the lapel and chest areas. However, it has been found that the use of the same canvas material in the lapel and cheat areas does not provide the optimum support and appearance for these areas of the coat. In particular, if a relatively heavy canvas material is used, the support of the coat is optimized. But, the lapel will then appear relatively firm. Therefore, while the use of certain canvas materials is advantageous to the support of the coat, these materials can also detract from the appearance of the coat.

Therefore, a coat construction that overcomes the disadvantages of the past is needed.

SUMMARY OF THE INVENTION

Briefly stated, the present invention is directed to a coat having a construction and a combination of advantages never known to exist before. The present invention includes a shell piece, a fusible interlining, a lapel support component, and a separate chest support component. The shell piece includes body and lapel portions. The body portion has a curved upper edge for attachment to a sleeve. The fusible interlining is attached to only the body portion of the shell piece. The lapel support component is formed from a material having a first average weight and is attached to only the lapel portion of the shell piece. The separate chest support component is formed from a material having a second average weight distinct from the first average weight The chest support component is attached to only the body portion of the shell piece.

According to one aspect of the present invention, this improved construction provides a durable coat that also has an enhanced lapel appearance.

According to another aspect of the present invention, two distinct materials are used to support the lapel and chest areas of the coat. Therefore, these materials can be precisely selected based on their individual characteristics in order to thereby optimize the durability, support and appearance of the coat.

According to a further aspect of the present invention, this improved construction allows the coat to be manufactured in an advantageous manner. More specifically, the coat of the present invention may be manufactured using a process that is easily implemented in a manufacturing facility producing coats of other constructions.

These aspects of the invention are provided through the novel coat construction disclosed and claimed herein. Other advantages and benefits will become known to the artisan through study of the following description, and the attached drawings.

DETAILED DESCRIPTION OF THE PREFERRED EMBODIMENTS

Figure 1:
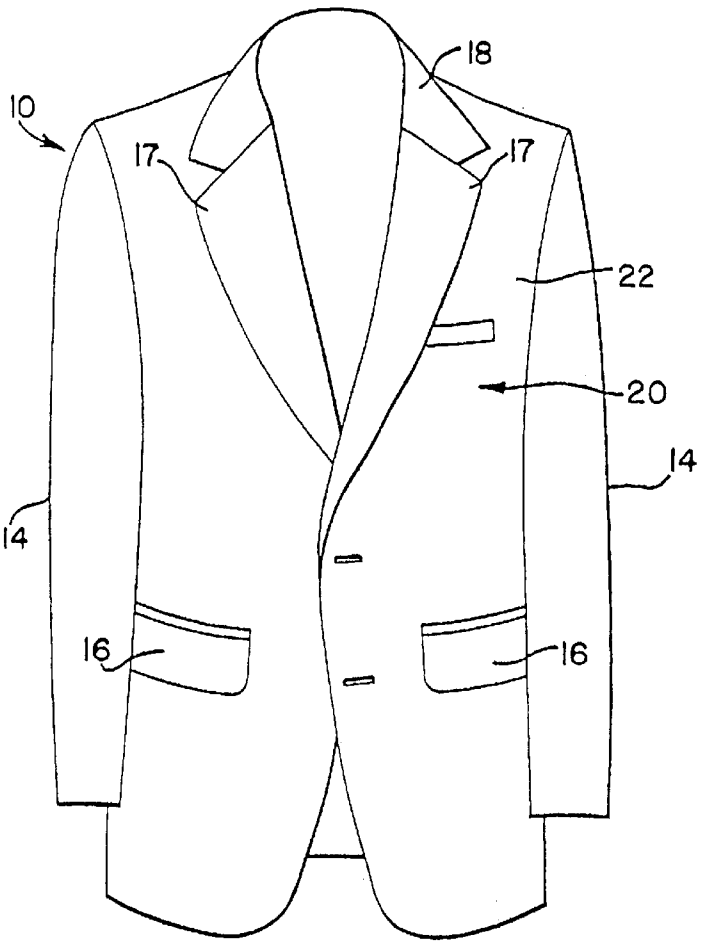
FIG. 1 is an illustration of a preferred embodiment of the coat of the present invention.

FIG. 1 is an illustration of a preferred embodiment of the present invention. While a suit coat 10 is depicted in the FIGURES, the teachings of the present invention are applicable to other types of coats such as apart coats or the like, all of which are intended to be encompassed within the term "suit coat." In addition, the suit coat 10 can come in a wide variety of sizes and styles designed to suit the needs of the individual uses. The suit coat 10 includes sleeves 14, pockets 16, lapels 17 and a collar 18. In addition, the front panel of the suit coat 10 includes a shell piece 20 with the outer surface 22 being shown in FIG. 1.

Figure 2:
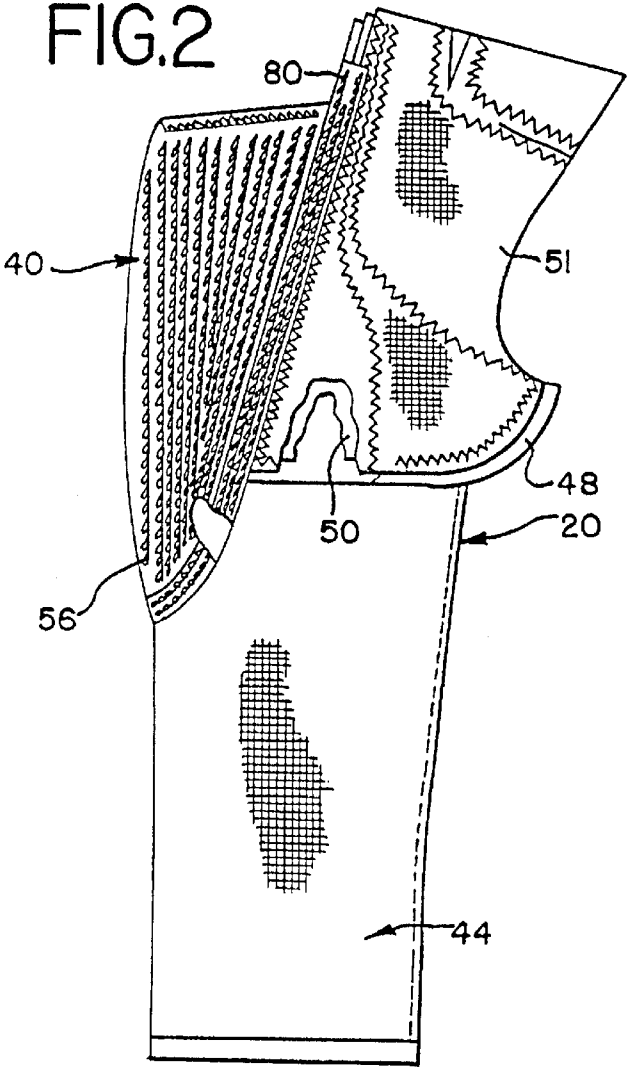
FIG. 2 is as illustration of a preferred shell piece and the preferred supporting components shown completely assembled.
Figure 3:
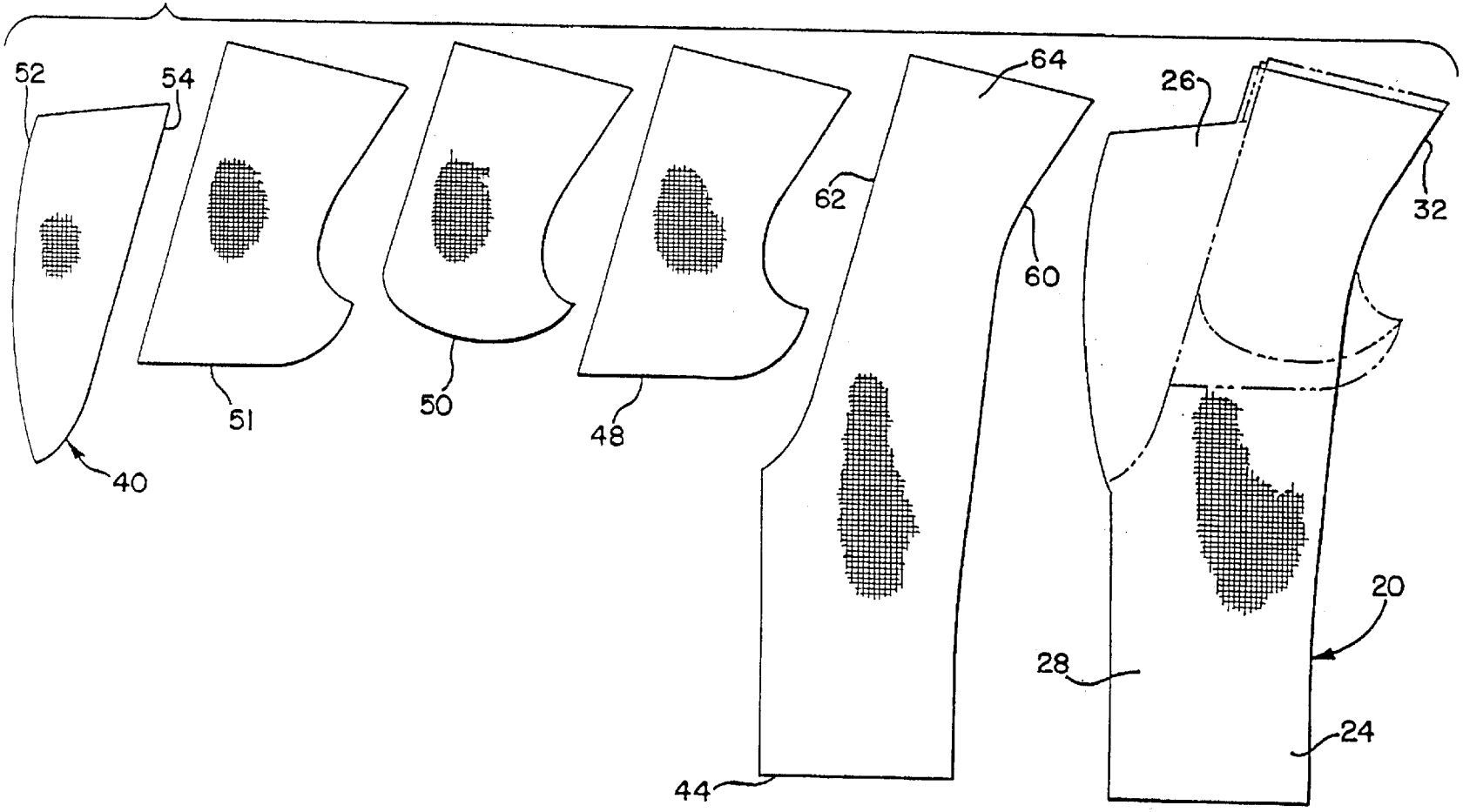
FIG. 3 is an illustration of the preferred shell piece of FIG. 2 with the preferred supporting components shown unassembled.

As best shown in FIGS. 2–3, the shell piece 20 also includes as inner surface 24 that includes two surface portions, i.e., the lapel portion 26 and the body portion 28. The lapel portion 26 includes that area of the shell piece 20 that will be folded over to form the lapel 17. The body portion 28 includes the remaining inner surface area of the shell piece 20. A curved upper edge 32 is later attached to the sleeve 14 during the construction of the garment.

The shell fabric of the suit coat 10, including the shell piece 20, can be chosen from a wide variety of materials known to those of ordinary skill in the art. For example, materials such as wool, cotton or polyester could be used. In addition, a wide variety of composite materials such as synthetic wool blends may also be used.

As best seen in FIGS. 1–3, the support structure of the suit coat 10 includes a lapel support piece 40, as interlining 44, a chest piece 48, a shoulder reinforcement piece 50, and a felt layer 51 The lapel support piece 40 is attached to the lapel portion 26 of the shell piece 20 in order to provide support for this portion of the suit coat 10. The lapel support piece 40 includes a curved outer edge 52 and a curved inner edge 54. The width of the lapel support piece 40 is greater than the width of the lapel portion 26 of the shell piece 20. In this manner, the lapel 17 may be folded over without causing the lapel support piece 40 to pucker. In a preferred embodiment, the lapel support piece 40 is sewn to lapel portion 26 using a felling stitch 56. According to another embodiment, dispersed dots of resin may also be used to bond the lapel support piece 40 to the lapel portion 26.

Preferably, the lapel support piece 40 is constructed from a lightweight, wool-containing, canvas material. One preferred material is manufactured by the Crown Textile Company of Talladega, Ala. under Style #730 and #747. This material has a fiber content of 40% rayon, 32% wool, 18% polyester and 10% hair. In addition, this material has as overall weight of 4.3 oz./sq. yard, a warp thread count of 66 ends/inch, and a filling thread count of 46 picks/inch. The warp yarn size is 16/1 and filling yarn size is 1/20.

The interlining 44 is attached to the body portion 28 of the shell piece 20 in order to provide support for this portion of the suit coat 10. In the preferred embodiment, the interlining 44 is formed from a fusible synthetic material, e.g., a material having a surface treated with a resin that will bond to an adjacent layer through the application of heat. The interlining 44 includes a first curved edge 60 for attachment to a sleeve 14 and a second curved edge 62 for attachment to the inner edge 54 of the lapel support piece 40. Suitable materials are available from Lainiere de Picardie, Inc. of Peronne Ceder, France, under Style #3940 or #2771, or the Kufner Textile Corporation of Munich, Germany, under Style Nos. #121 or #8131. In addition, suitable materials are also available from the RIK Textile Corporation of New York, N.Y., under Style #3609 or from the Freudenberg Nonwovens Limited Partnership of Chelmsford, Mass. under Style #8413. As an example of the composition of these materials, Style #3940 has a base composition of 41% viscose, 37% polyamide and 22% polyester. The warp has a composition of 53% viscose and 47% polyamide and the weft has a composition of 100% polyester. This material has a weight of 93 g/m$^2$ with the fusing conditions for this material being at 140°150° C. for 12–15 seconds.

The purpose of the chest piece 48 is to support the chest area of the suit coat 10. As shown in FIG. 2, the chest piece 48 is sewn to the upper portion 64 of the interlining 44. It should be recognized that the chest piece 48 could also be constructed from multiple layers of materials. As used encompass multiple layers of material.

According to the preferred embodiment, the chest piece 48 is made from a canvas material having a greater average weight than the material used to form the lapel support piece 40. As used herein, the average weight is the weight per square yard or meter. In contrast to the preferred material used to construct the lapel support piece 40, the chest piece 48 is preferably manufactured from a canvas material available from Lainiere de Picardie, Inc. under Canvas Style #72528. This material has a base composition of 87% viscose and 13% polyamide, a warp composition of 51% viscose and 49% polyamide and a weft composition of 100% viscose. In addition, this material has a weight of 215 g/m$^2$.

The shoulder reinforcement piece 50 provides further support for the shoulder area of suit coat 10 and is sewn on top of the chest piece 48. According to the preferred embodiment of the invention, the shoulder reinforcement piece 50 is made from the same material used to construct the chest piece 48. A felt layer 51 is then sewn on top of the shoulder reinforcement piece 50. A preferred felt material is available from Lainiere de Picardie, Inc. under Felt Style #014. This material has a composition of 90% rayon and 10% wool.

A tape 80 is then applied over the second curved edge 62 of the interlining 44. In the preferred embodiment, an adhesive tape is fused and then sewn to the interlining 44 and lapel support piece 40. A suitable adhesive tape is available from Lainiere de Picardie, Inc. Alternatively, the tape could be basted and sewn to the interlining 44.

As an example, the suit coat 10 can be constructed using a wool shell fabric. The preferred material used to construct the lapel support piece 40 is available from Crown Textile Company under Style #730 and #747. While a wide variety of materials may be used to construct the interlining 44, the preferred material for use with a wool shell fabric is available from Lainiere de Picardie, Inc. under Style #2771. In particular, the relative "shrinkage rate" of the shell piece 20 and interlining 44 must be minimized in order to avoid delamination of the interlining 44. Therefore, as those of ordinary skill in the art will recognize, the selection of a particular shell fabric often requires the use of a particular material having a similar "shrinkage rate" to form the interlining 44. The preferred material used to construct the chest piece 48 and the shoulder reinforcement piece 50 is the canvas material available from Lainiere de Picardie, Inc. under Canvas Style #72528. The preferred felt layer 51 is also available from Lainiere de Picardie, Inc. under Felt Style #014.

In addition to the improved appearance and durability of a coat constructed in accordance with the present invention, a number of manufacturing advantages are provided. For example, a plant manufacturing a coat having a traditional fusible construction, i.e., a coat having a fusible material across the entire inner surface of the shell piece together with a chest piece, may be easily modified to also manufacture a coat according to the present invention. Therefore, while it can be difficult to produce coats having different constructions in the same plant, the coat of the present invention may be easily manufactured in a plant with at least one other coat construction.

The preferred embodiment described is illustrative and not restrictive. The scope of the invention is indicated by the claims rather than by the foregoing description. The invention may be embodied in other specific forms without departing from the spirit of the invention, e.g., the selection of materials or the exact physical structure could be modified as recognized by those of ordinary skill in the art. Accordingly, all changes which come within the scope of the claims are intended to be embraced therein.

I claim:

1. A suit coat having first and second sleeves and a collar, the suit coat comprising:

a shell piece having outer and inner surfaces and including a body portion and a lapel portion, the body portion having a curved upper edge for attachment to the first sleeve;

an interlining attached to the shell piece at only the body portion thereof, the interlining being formed from a fusible material;

a lapel support component attached to the shell piece at only the lapel portion thereof, the lapel support component being formed from a first canvas material having a first average weight; and a chest support component separate from the lapel support component, the chest support component attached to the shell piece at only the body portion thereof, and bring formed from a second canvas material having a second average weight distinct from the first average weight.

2. The suit coat construction of claim 1 wherein the second canvas material has an average weight greater than that of the first canvas material.

3. The suit coat construction of claim 2 wherein the chest support component is attached to the shell piece by direct attachment to the interlining.

4. The suit coat construction of claim 3 further comprising a shoulder reinforcement component attached between a felt layer and the chest support component.

5. The suit coat construction of claim 4 wherein the chest support component comprises multiple layers.

6. The suit coat construction of claim 4 wherein the lapel support component is sewn to the lapel portion of the shell piece using a felling stitch.

7. The suit coat construction of claim 4 wherein the interlining has a curved upper edge that extends over and is fused onto a curved interior edge of the lapel support component.

8. The suit coat construction of claim 7 further comprising a piece of tape attached over the curved upper edge of the interlining.

9. The suit coat construction of claim 8 wherein the tape is sewn to the interlining and the lapel support component.

10. A coat construction comprising:

a shell piece having a body portion and a lapel portion, the body portion having a curved upper edge for attachment to a sleeve;

an interlining attached to the shell piece at the body portion thereof, the interlining being formed from a fusible material;

a lapel support component attached to the shell piece at the lapel portion thereof, the lapel support component being formed from a first material; and a chest support component separate from the lapel support component, the chest support component attached to the shell piece at the body portion thereof, and formed from a second material having an average weight different from that of the first material.

11. The coat construction of claim 10 wherein the second material has an average weight greater than that of the first material.

12. The coat construction of claim 11 wherein the chest support component is attached to the shell piece by direct attachment to the interlining.

13. The coat construction of claim 12 further comprising a shoulder reinforcement component attached between a felt component and the chest support component.

14. The coat construction of claim 13 wherein the shoulder reinforcement component and the chest support component are formed from the same type of material.

15. The coat construction of claim 14 wherein the lapel support component is sewn to the lapel portion of the shell piece using a felling stitch.

16. The coat construction of claim 15 wherein the chest support component comprises multiple layers.

17. The coat construction of claim 16 further comprising a piece of tape attached over the curved upper edge of the interlining.

18. The coat construction of claim 17 wherein the tape comprises an adhesive tape.

19. A suit coat having first and second sleeves and a collar, the suit coat comprising:

a shell piece having outer and inner surfaces and including a body portion and a lapel portion, the body portion having a curved upper edge for attachment to the first sleeve, the shell piece being formed from one of a wool material, a wool blended material, a cotton material or a cotton blended material;

an interlining attached to the shell piece at only the body portion thereof, the interlining being formed from a fusible material;

a lapel support component attached to the shell piece at only the lapel portion thereof, the lapel support component being formed from a first canvas material having a first average weight, the lapel support component being sewn to the lapel portion of the shell piece using a felling stitch and fused to a curved upper edge of the interlining; and a chest support component separate from the lapel support component, the chest support component attached to the shell piece at only the body portion thereof, the chest support component being formed from a second canvas material having a second average weight greater than that of the first canvas material.

20. The suit coat construction of claim 19 wherein the chest support component is attached to the shell piece by direct attachment to the interlining.

21. A coat construction comprising:

a shell piece having a body portion and a lapel portion, the body portion having a curved upper edge for attachment to a sleeve;

an interlining attached to the shell piece at the body portion thereof, the interlining being formed from a fusible material;

a lapel support component attached to the shell piece at the lapel portion thereof, the lapel support component being formed from a first material; and a chest support component separate from the lapel support component, the chest support component attached to the interlining, and formed from a second material having an average weight different from that of the first material.

22. The coat construction of claim 21 wherein the second material has an average weight greater than that of the first material.

23. The coat construction of claim 22 further comprising a felt component attached to the chest support component.

24. The coat construction of claim 23 further comprising a shoulder reinforcement component attached between the felt component and the chest support component.

25. The coat construction of claim 24 wherein the shoulder reinforcement component and the chest support component are formed from the same type of material.

26. The coat construction of claim 25 wherein the lapel support component is sewn to the lapel portion of the shell piece using a felling stitch.

27. The coat construction of claim 26 wherein the chest support component comprises multiple layers.

28. The coat construction of claim 27 further comprising a piece of tape attached over the curved upper edge of the interlining.

29. The coat construction of claim 28 wherein the tape comprises an adhesive tape.

*30. A suit coat having first and second sleeves and a collar, the suit coat comprising:*

*a shell piece having outer and inner surfaces and including a body portion and a lapel portion;*

*an interlining attached to the shell piece at the body portion thereof, the interlining being formed from a fusible material;*

*a lapel support component attached to the shell piece at the lapel portion thereof and located primarily over the lapel portion of the shell piece, the lapel support component being formed from a first canvas material having a first average weight: and*

*a chest support component separate from the lapel support component, the chest support component attached to the shell piece at the body portion thereof and located primarily over the body portion of the shell piece, and the chest support component being formed from a second canvas material having a second and distinct average weight.*

*31. The suit coat construction of claim 30 wherein the second canvas material has an average weight greater than that of the first canvas material.*

*32. The suit coat construction of claim 31 wherein the chest support component comprises multiple layers.*

*33. The suit cost construction of claim 31 wherein the chest support component is attached to the shell piece by direct attachment to the interlining.*

*34. The suit coat construction claim 33 further comprising a shoulder reinforcement component attached between a felt layer and the chest support component.*

*35. The suit coat construction claim 34 wherein the lapel support component is sewn to the lapel portion of the shell piece using a felling stitch.*

*36. The suit coat construction of claim 34 wherein the interlining has a curved upper edge that extends over and is fused onto a curved interior edge of the lapel support component.*

*37. The suit coat construction of claim 36 further comprising a piece of tape attached to the felt layer.*

*38. The suit coat construction of claim 37 wherein said tape is sewn to the felt layer.*

*39. A coat construction comprising:*

*a shell piece having a body portion and a lapel portion;*

*an interlining attached to the shell piece and located primarily over the body portion thereof, the interlining being formed from a fusible material:*

*a label support component attached to the shell piece and located primarily over the lapel portion of the shell piece, the lapel support component being formed from a first material; and*

*a chest support component separate from the label support component, the chest support component attached to the shell piece and located primarily over the body portion of the shell piece, the chest support component formed from a second material having an average weight different from that of the first material.*

*40. The coat construction of claim 39 wherein the second material has an average weight greater than that of the first material.*

*41. The coat construction of claim 40 wherein the chest support component is attached to the shell piece by direct attachment to the interlining.*

*42. The coat construction of claim 41 further comprising a shoulder reinforcement component attached between a felt component and the chest support component.*

*43. The coat construction of claim 42 wherein the felt component is sewn to the chest support component.*

*44. The coat construction of claim 43 wherein the lapel support component is sewn to the lapel portion of the shell piece using a felling stitch.*

*45. The coat construction of claim 44 wherein the lapel support component includes a curved outer edge.*

*46. The coat construction of claim 45 wherein the chest support component is larger than the shoulder reinforcement component.*

*47. The coat construction of claim 46 wherein the chest support component includes a substantially straight side edge adjacent the lapel support component.*

*48. The coat construction of claim 47 wherein the first and second materials are different types of canvas.*

* * * * *